(12) United States Patent
Shi et al.

(10) Patent No.: US 12,089,530 B2
(45) Date of Patent: Sep. 17, 2024

(54) WALKING POWER CONTROL SYSTEM FOR WOLFBERRY PICKING

(71) Applicants: Ningxia Academy of Agriculture and Forestry Sciences, Ningxia (CN); Wolfberry Scientific Institute, Ningxia Academy of Agriculture and Forestry Sciences, Ningxia (CN); Ningxia Keqi Modern Agricultural Machinery Technology Service Co. LTD, Ningxia (CN)

(72) Inventors: Zhigang Shi, Ningxia (CN); Ru Wan, Ningxia (CN); Tinghui Ma, Ningxia (CN); Guoli Dai, Ningxia (CN); Libin Yang, Ningxia (CN); Xiao Wang, Ningxia (CN); Youlong Cao, Ningxia (CN); Wei An, Ningxia (CN); Xiyan Zhang, Ningxia (CN); Yunxiang Li, Ningxia (CN); Xueqin Jiang, Ningxia (CN); Ken Qin, Ningxia (CN); Jianhua Zhao, Ningxia (CN); Xiuying Wang, Ningxia (CN); Jian Zhang, Ningxia (CN); Feng Wei, Ningxia (CN); Xinlin Sha, Ningxia (CN); Lina Zhou, Ningxia (CN); Jie Lu, Ningxia (CN); Danqing Zhao, Ningxia (CN)

(73) Assignees: Ningxia Academy of Agriculture and Forestry Sciences, Ningxia (CN); Wolfberry Scientific Institute, Ningxia Academy of Agriculture and forestry Sciences, Ningxia (CN); Ningxia Keqi Modern Agricultural Machinery Technology Service Co. LTD, Ningxia (CN)

( * ) Notice: Subject to any disclaimer, the term of this patent is extended or adjusted under 35 U.S.C. 154(b) by 775 days.

(21) Appl. No.: 17/337,379

(22) Filed: Jun. 2, 2021

(65) Prior Publication Data

US 2021/0282323 A1 Sep. 16, 2021

Related U.S. Application Data

(63) Continuation of application No. PCT/CN2020/139551, filed on Dec. 25, 2020.

(51) Int. Cl.
*A01D 46/26* (2006.01)

(52) U.S. Cl.
CPC ...... *A01D 46/264* (2013.01); *A01D 2046/266* (2013.01)

(58) Field of Classification Search
CPC . A01D 46/264; A01D 2046/266; A01D 46/26
See application file for complete search history.

(56) References Cited

U.S. PATENT DOCUMENTS

| 4,768,332 A * | 9/1988 | Bizzini | A01D 46/26 56/328.1 |
| 7,337,600 B2 * | 3/2008 | Kallevig | A01D 43/00 56/17.4 |

(Continued)

FOREIGN PATENT DOCUMENTS

| CN | 102009691 A | 4/2011 | |
| CN | 102349395 A * | 2/2012 | ............. A01D 46/26 |

(Continued)

*Primary Examiner* — Arpad Fabian-Kovacs

(57) ABSTRACT

A walking power control system for wolfberry picking, including a frame, a turntable, rotating rods, first gears, second gear, gear racks, supporting rods, hydraulic motors, a front traveling wheel, a left traveling wheel and a right traveling wheel. Hydraulic motors rotate to drives three traveling wheels to rotate, thereby driving the frame to move, when it is necessary to turn, a turntable is rotated, the turntable rotates to drive two first gears to rotate, and the two first gears rotate to drive the supporting rods to rotate, (Continued)

thereby driving the left traveling wheel and the right traveling wheel to rotate, so that the traveling direction of the frame is changed.

6 Claims, 2 Drawing Sheets

(56) References Cited

U.S. PATENT DOCUMENTS

| | | | | |
|---|---|---|---|---|
| 7,416,040 B2* | 8/2008 | Dvorak | ............... | A01B 51/02 56/17.6 |
| 10,973,168 B2* | 4/2021 | Hans | ............... | G05D 1/248 |
| 2002/0156556 A1* | 10/2002 | Ruffner | ............... | G05D 1/0282 342/357.66 |
| 2003/0213221 A1* | 11/2003 | Youman | ............... | A01D 46/264 56/328.1 |
| 2005/0108997 A1* | 5/2005 | Hunt | ............... | G05D 1/0282 56/6 |
| 2005/0108998 A1* | 5/2005 | Hunt | ............... | A01D 34/008 56/6 |
| 2007/0256868 A1* | 11/2007 | Romig | ............... | B62D 7/023 180/6.5 |
| 2013/0140801 A1* | 6/2013 | Schlee | ............... | B62D 57/024 280/762 |
| 2014/0102061 A1* | 4/2014 | Sandin | ............... | G05D 1/0261 901/1 |
| 2014/0157747 A1 | 6/2014 | Shoji et al. | | |
| 2020/0206896 A1* | 7/2020 | Wong | ............... | A01B 51/00 |
| 2020/0239090 A1* | 7/2020 | Kong | ............... | B60C 11/0306 |
| 2021/0298229 A1* | 9/2021 | Takahashi | ............... | A01D 34/008 |

FOREIGN PATENT DOCUMENTS

| | | | | | |
|---|---|---|---|---|---|
| CN | 108029338 | A | | 5/2018 | |
| CN | 109005918 | A | * | 12/2018 | ........... A01D 46/264 |
| CN | 208425222 | U | | 1/2019 | |
| CN | 107750641 | A | * | 3/2019 | ........... A01D 46/264 |
| CN | 110036765 | A | * | 7/2019 | ........... A01D 46/264 |
| CN | 110692361 | A | | 1/2020 | |
| CN | 112166823 | A | * | 1/2021 | ........... A01D 46/264 |
| CN | 109005874 | B | * | 9/2022 | ........... A01D 34/006 |
| DE | 202018004974 | U1 | | 12/2018 | |
| WO | WO-2019030596 | A1 | * | 2/2019 | ............. A01D 46/26 |
| WO | WO-2019167204 | A1 | * | 9/2019 | ........... G05D 1/0044 |
| WO | WO-0135721 | A2 | * | 1/2021 | ............. A01D 46/26 |
| WO | WO-2021096722 | A1 | * | 5/2021 | ........... A01D 34/008 |

* cited by examiner

WALKING POWER CONTROL SYSTEM FOR WOLFBERRY PICKING

CROSS REFERENCE TO RELATED APPLICATION

This application is a U.S. National Stage Entry of PCT Application with No. PCT/CN2020/139551, filed on Dec. 25, 2020.

FIELD OF TECHNOLOGY

The present disclosure relates to the technical field of power control systems, in particular to a walking power control system for wolfberry picking.

BACKGROUND

Wolfberry is a plant of Solanaceae and *Lycium*. Wolfberry is a general name of *Lycium* species such as commercial wolfberry, plant *Lycium barbarum* and Chinese wolfberry. Most of the wolfberries eaten and used by people in daily life are the fruits of the Ningxia *Lycium barbarum*, and the Ningxia *Lycium barbarum* is the only variety recorded in the 2010 edition of Chinese Pharmacopoeia.

At present, most wolfberry picking relies on manual picking, small hand-held picking devices have been introduced in some places, however, no matter the manual picking or the small hand-held picking devices, the increasing wolfberry planting area cannot be met, and with the shortage of domestic labor, the labor cost is further increased.

SUMMARY

The present disclosure provides a walking power control system for wolfberry picking.

The present disclosure adopts the following technical solution: a walking power control system for wolfberry picking includes a frame, an upper surface of the frame is in a shape of an isosceles triangle and the frame is fixedly connected with three sleeves in a penetration manner, a supporting rod is rotatably arranged in the sleeve, a baffle is fixedly connected to an inner top of the sleeve, the supporting rod penetrates through the baffle, a damping spring is sleeved on an outer surface of one end of the supporting rod located in the sleeve, one end of the damping spring is fixedly connected with a lower surface of the baffle, a limiting piston is fixedly sleeved at a position of the supporting rod, the position is one end of the supporting rod located in the sleeve and near a bottom of the sleeve, the other end of the damping spring is fixedly connected with an upper surface of the limiting piston, a connecting plate is fixedly connected to one end of each of the three supporting rods located at a bottom of the frame, a front traveling wheel, a left traveling wheel and a right traveling wheel, which are rotatably connected with a rotating shaft, are respectively disposed in the three connecting plates, a mounting plate is fixedly connected to one side of an outer surface of each of the three connecting plates, a hydraulic motor is respectively arranged at a lower surface of the three mounting plates, an output shaft of the hydraulic motor is fixedly connected with one end of the rotating shaft, a horizontal plate is fixedly connected to one side of the outer surface of the connecting plate far away from the front traveling wheel, the supporting rods at tops of the left traveling wheel and the right traveling wheel both penetrate through a top of the frame, moreover, a first gear is fixedly sleeved on an outer surface of one end of the supporting rod located above the frame, a rotating rod is rotatably connected to a position of the upper surface of the frame located between the left traveling wheel and the right traveling wheel, a second gear is fixedly sleeved on an outer surface of the rotating rod, a supporting seat is respectively fixedly connected to positions of the upper surface of the frame located on both sides of the rotating rod, slide bars are slidably connected in the two supporting seats in a penetration manner, gear racks are fixedly connected to positions of outer surfaces of the slide bars close to the first gear and the second gear, and a vibrating and shaking device is fixedly connected in the frame.

In at least one embodiment:
The gear racks are meshed with the first gear and the second gear, respectively.

In at least one embodiment:
Partition plates that are fixedly connected by bolts are disposed at a lower surface of the mounting plate and at positions located on both sides of the hydraulic motor.

In at least one embodiment:
A turntable is fixedly connected to a top end of the rotating rod.

In at least one embodiment:
The vibrating and shaking device includes a mounting frame, a left vibrating brush and a right vibrating brush, the mounting frame is fixedly arranged in the frame, and the left vibrating brush and the right vibrating brush are rotatably connected to both sides of the mounting frame, respectively.

In at least one embodiment:
A brake is fixedly connected to a lower surface of the horizontal plate, and a braking end of the brake is fixedly connected to one end of the rotating shaft.

The present disclosure has the following beneficial effects:

1. The walking power control system for wolfberry picking is provided with the frame, the turntable, the rotating rod, the second gear, the gear racks, the first gear, the supporting rods, the hydraulic motors, the front traveling wheel, the left traveling wheel and the right traveling wheel. The hydraulic motors are started to drive the three traveling wheels to rotate, thereby driving the frame to move, when it is necessary to turn, the turntable is rotated to drive the second gear on the rotating rod to rotate, the second gear rotates to drive the two gear racks to move, thereby driving the two first gears to rotate, the two first gears rotate to drive the supporting rods to rotate, thereby driving the left traveling wheel and the right traveling wheel to rotate, so that the travelling direction of the frame is changed. The picking speed of wolfberries is greatly improved, thus improving the working efficiency and saving a lot of human resources.

2. The walking power control system for wolfberry picking is provided with the vibrating and shaking device, the damping spring, the baffle and the limiting piston, when the frame is traveling on an uneven road, the limiting piston and the baffle compress the damping spring, thereby achieving a damping effect to allow the frame to be in a stable state, and when the wolfberries enter the vibrating and shaking device, the left vibrating brush and the right vibrating brush swing at the same time, thereby realizing the mechanized picking of the wolfberries, in this way, the manual labor is reduced, and the picking efficiency is improved.

Figure 1:
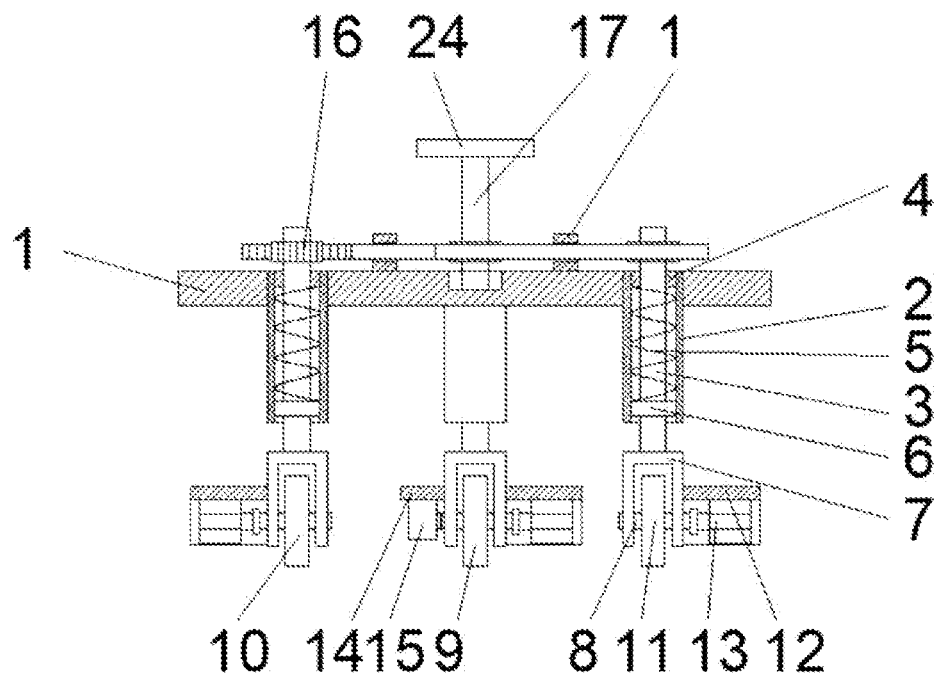
FIG. 1 shows a schematic diagram of an overall structure of the present disclosure.

REFERENCE SIGNS 1. frame; 2. sleeve; 3. supporting rod; 4. baffle; 5. damping spring; 6. limiting piston; 7. connecting plate; 8. rotating shaft; 9. front traveling wheel; 10. left traveling wheel; 11. right traveling wheel; 12. mounting plate; 13. hydraulic motor; 14. horizontal plate; 15. brake; 16. first gear; 17. rotating rod; 18. second gear; 19. supporting seat; 20. slide bar; 21. gear rack; 22. vibrating and shaking device; 23. partition plate; 24. turntable; 25. mounting frame; 26. left vibrating brush; 27. right vibrating brush.

DETAILED DESCRIPTION OF THE EMBODIMENTS

A clear and complete description of technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those skilled in the art based on the embodiments in the present disclosure without any creative effort, fall into the protection scope of the present disclosure.

In the description of the present disclosure, it should be noted that the orientation or positional relationships indicated by the terms "center", "upper", "lower", "left", "right", "vertical", "horizontal", "inside", "outside" are orientation or positional relationships shown in the drawings, and are only for the convenience of describing the present disclosure and simplifying the description, but do not indicate or imply that the devices or elements referred to must have specific orientations or constructed and operated at specific orientations, thus cannot be understood as limitations to the present disclosure; and the terms "first", "second", and "third" are only used for descriptive purposes, and cannot be understood as indicating or implying relative importance. In addition, unless otherwise clearly specified and limited, the terms "installation", "connected" and "connection" should be understood in a broad sense. For example, it can be a fixed connection, a detachable connection, or an integral connection; it can be a mechanical connection, and it can also be an electrical connection; and it can be directly connected, or indirectly connected through an intermediate medium, and it can be the internal communication between two elements. For those skilled in the art, the specific meaning of the above-mentioned terms in the present disclosure can be understood under specific circumstances.

Figure 2:
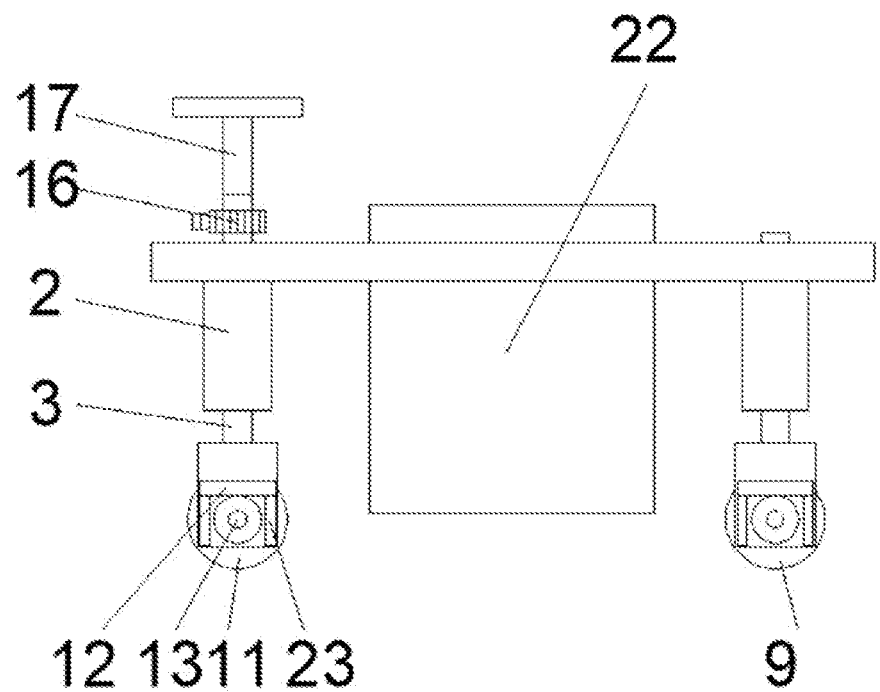
FIG. 2 shows a side view of the present disclosure.
Figure 3:
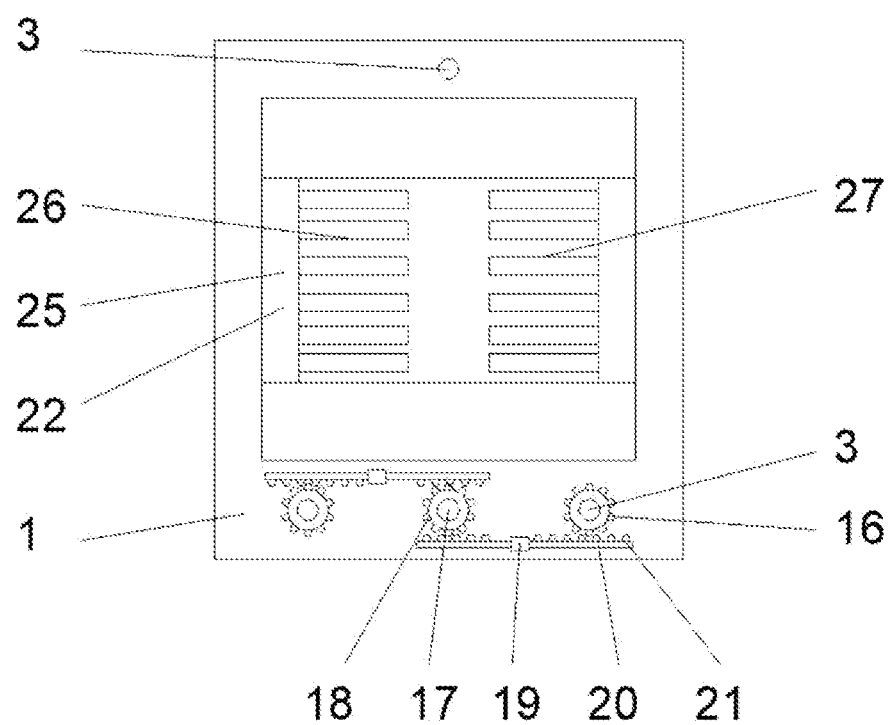
FIG. 3 shows a top view of the present disclosure.

Referring to FIG. 1 to FIG. 3, an embodiment provided by the present disclosure: a walking power control system for wolfberry picking includes a frame 1, an upper surface of the frame 1 is in a shape of an isosceles triangle and the frame 1 is fixedly connected with three sleeves 2 in a penetration manner, a supporting rod 3 is rotatably arranged in the sleeves 2, a baffle 4 is fixedly connected to an inner top of the sleeves 2, the supporting rod 3 penetrates through the baffle 4, a damping spring 5 is sleeved on an outer surface of one end of the supporting rod 3 located in the sleeve 2, one end of the damping spring 5 is fixedly connected with a lower surface of the baffle 4, a limiting piston 6 is fixedly sleeved at a position of the supporting rod 3 that is one end of the supporting rod 3 located in the sleeve 2 and near a bottom of the sleeve 2, the other end of the damping spring 5 is fixedly connected with an upper surface of the limiting piston 6, a connecting plate 7 is fixedly connected to one end of each of the three supporting rods 3 located at the bottom of the frame 1, a front traveling wheel 9, a left traveling wheel 10 and a right traveling wheel 11, which are rotatably connected to a rotating shaft 8, are respectively disposed in the three connecting plates 7, a mounting plate 12 is fixedly connected to one side of an outer surface of each of the three connecting plates 7, a hydraulic motor 13 is respectively arranged at a lower surface of the three mounting plates 12, an output shaft of the hydraulic motor 13 is fixedly connected with one end of the rotating shaft 8, a horizontal plate 14 is fixedly connected to one side of the outer surface of the connecting plate 7 far away from the front traveling wheel 9, the supporting rods 3 at tops of the left traveling wheel 10 and the right traveling wheel 11 both penetrate through a top of the frame 1, moreover, a first gear 16 is fixedly sleeved on an outer surface of one end of the supporting rod 3 located above the frame 1, a rotating rod 17 is rotatably connected to a position of the upper surface of the frame 1 located between the left traveling wheel 10 and the right traveling wheel 11, a second gear 18 is fixedly sleeved on an outer surface of the rotating rod 17, a supporting seat 19 is respectively fixedly connected to positions of the upper surface of the frame 1 located on the both sides of the rotating rod 17, slide bars 20 are slidably connected in the two supporting seats 19 in a penetration manner, gear racks 21 are fixedly connected to positions of outer surfaces of the slide bars 20 close to the first gear 16 and the second gear 18, and a vibrating and shaking device 22 is fixedly connected in the frame 1.

The gear racks 21 are meshed with the first gear 16 and the second gear 18 respectively, so that the first gear 16 can rotate simultaneously through the gear racks 21 when the second gear 18 rotates, thereby changing the traveling direction of the frame 1; partition plates 23 that are fixedly connected by bolts are disposed at a lower surface of the mounting plate 12 and at positions located on both sides of the hydraulic motor 13, and the partition plates 23 are used for protecting the hydraulic motors 13; a turntable 24 is fixedly connected to a top end of the rotating rod 17, and the turntable 24 is facilitated to rotate the rotating rod 17; the vibrating and shaking device 22 includes a mounting frame 25, a left vibrating brush 26 and a right vibrating brush 27, the mounting frame 25 is fixedly arranged in the frame 1, and the left vibrating brush 26 and the right vibrating brush 27 are rotatably connected to both sides of the mounting frame 25, respectively, so as to replace manual picking and improve the picking efficiency of wolfberries; a brake 15 is fixedly connected to the lower surface of the horizontal plate 14, and a braking end of the brake 15 is fixedly connected with one end of the rotating shaft 8, and the brake 15 is used for braking the front traveling wheel 9 to avoid the situation that the frame 1 cannot be stopped.

Working principle: when the walking power control system for wolfberry picking is used, the hydraulic motors 13 are started to drive the three traveling wheels to rotate, thereby driving the frame 1 to move, when it is necessary to turn, the turntable 24 is rotated to drive the second gear 18 on the rotating rod 17 to rotate, the second gear 18 rotates to drive the two gear racks 21 to move, thereby driving the two first gears 16 to rotate, the two first gears 16 rotate to drive the supporting rods 3 to rotate, thereby driving the left traveling wheel 10 and the right traveling wheel 11 to rotate, so that the travelling direction of the frame 1 is changed. When the frame 1 is traveling on an uneven road, the limiting piston 6 and the baffle 4 compress the damping spring 5, thereby achieving a damping effect to allow the frame 1 to be in a stable state, and when the wolfberries enter the vibrating and shaking device 22, the left vibrating brush 26 and the right vibrating brush 27 swing at the same time, thereby realizing the mechanized picking of the wolfberries, in this way, the manual labor is reduced, the picking efficiency is improved, and the picking speed of wolfberries is greatly improved, thus improving the working efficiency and saving a lot of human resources.

Finally, it should be noted that the above descriptions are only part embodiments of the present disclosure, and are not intended to limit the present disclosure. Although the present disclosure has been described in detail with reference to the foregoing embodiments, for those skilled in the art, they can still make modifications to the technical solutions recorded in the foregoing embodiments, or make equivalent replacements to some technical features. Any modifications, equivalent replacements, improvements and the like made within the spirit and principle of the present disclosure are should all included in the protection scope of the present disclosure.

The invention claimed is:

1. A walking power control system for wolfberry picking, comprises a frame (1), wherein, an upper surface of the frame (1) is in a shape of an isosceles triangle and the frame (1) is fixedly connected with three sleeves (2) in a penetration manner, a supporting rod (3) is rotatably arranged in the sleeve (2), a baffle (4) is fixedly connected to an inner top of the sleeve (2), the supporting rod (3) penetrates through the baffle (4), a damping spring (5) is sleeved on an outer surface of one end of the supporting rod (3) located in the sleeve (2), one end of the damping spring (5) is fixedly connected with a lower surface of the baffle (4), a limiting piston (6) is fixedly sleeved at a position of the supporting rod (3), the position is one end of the supporting rod (3) located in the sleeve (2) and near a bottom of the sleeve (2), the other end of the damping spring (5) is fixedly connected with an upper surface of the limiting piston (6), a connecting plate (7) is fixedly connected to one end of each of the three supporting rods (3) located at a bottom of the frame (1), a front traveling wheel (9), a left traveling wheel (10) and a right traveling wheel (11), which are rotatably connected with a rotating shaft (8), are respectively disposed in the three connecting plates (7), a mounting plate (12) is fixedly connected to one side of an outer surface of each of the three connecting plates (7), a hydraulic motor (13) is respectively arranged at a lower surface of the three mounting plates (12), an output shaft of the hydraulic motor (13) is fixedly connected with one end of the rotating shaft (8), a horizontal plate (14) is fixedly connected to one side of the outer surface of the connecting plate (7) far away from the front traveling wheel (9), the supporting rods (3) at tops of the left traveling wheel (10) and the right traveling wheel (11) both penetrate through a top of the frame (1), moreover, a first gear (16) is fixedly sleeved on an outer surface of one end of the supporting rod (3) located above the frame (1), a rotating rod (17) is rotatably connected to a position of the upper surface of the frame (1) located between the left traveling wheel (10) and the right traveling wheel (11), a second gear (18) is fixedly sleeved on an outer surface of the rotating rod (17), a supporting seat (19) is respectively fixedly connected to positions of the upper surface of the frame (1) located on both sides of the rotating rod (17), slide bars (20) are slidably connected in the two supporting seats (19) in a penetration manner, gear racks (21) are fixedly connected to positions of outer surfaces of the slide bars (20) close to the first gear (16) and the second gear (18), and a vibrating and shaking device (22) is fixedly connected in the frame (1).

2. The walking power control system for wolfberry picking according to claim 1, wherein, the gear racks (21) are meshed with the first gear (16) and the second gear (18), respectively.

3. The walking power control system for wolfberry picking according to claim 1, wherein, partition plates (23) that are fixedly connected by bolts are disposed at a lower surface of the mounting plate (12) and at positions located on both sides of the hydraulic motor (13).

4. The walking power control system for wolfberry picking according to claim 1, wherein, a turntable (24) is fixedly connected to a top end of the rotating rod (17).

5. The walking power control system for wolfberry picking according to claim 1, wherein, the vibrating and shaking device (22) comprises a mounting frame (25), a left vibrating brush (26) and a right vibrating brush (27), the mounting frame (25) is fixedly arranged in the frame (1), and the left vibrating brush (26) and the right vibrating brush (27) are rotatably connected to both sides of the mounting frame (25), respectively.

6. The walking power control system for wolfberry picking according to claim 1, wherein, a brake (15) is fixedly connected to a lower surface of the horizontal plate (14), and a braking end of the brake (15) is fixedly connected with one end of the rotating shaft (8).

* * * * *